W. R. LANDFEAR.
Eyelet-Making Machines.
No. 5,662. Reissued Nov, 18, 1873.
Fig. 1.
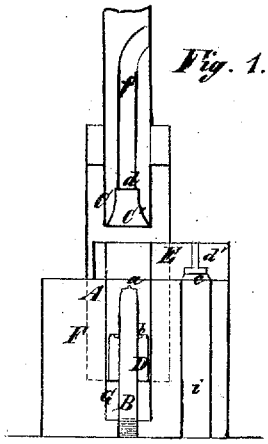
Fig. 4.
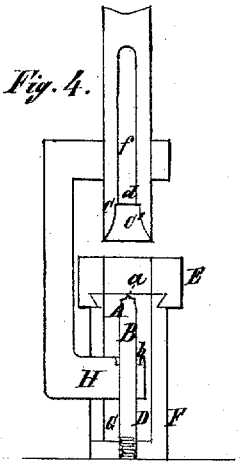
Fig. 2.
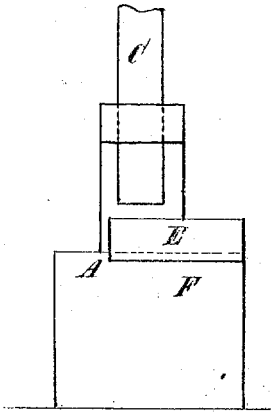
Fig. 5.
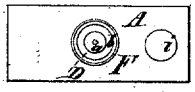
Fig. 3.
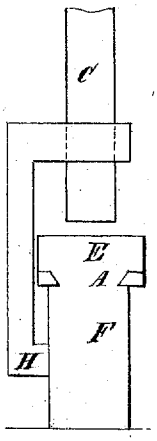
Fig. 12.
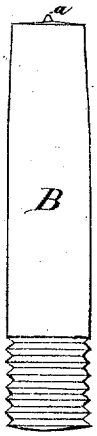
Fig. 6.
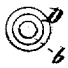
Fig. 7.
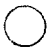
Fig. 8.
Fig. 9.
Fig. 10
Fig. 11.
Witnesses.
Jas Haynes
Ferd Dusch
Wm R. Landfear
by his Attorneys
Brown & Allen
A.M. PHOTO-LITHOGRAPHIC Co. N.Y. (OSBORNE'S PROCESS)

UNITED STATES PATENT OFFICE.

WILLIAM R. LANDFEAR, OF HARTFORD, CONNECTICUT, ASSIGNOR, BY MESNE ASSIGNMENTS, TO THE HARTFORD EYELET COMPANY, OF SAME PLACE.

IMPROVEMENT IN EYELET-MAKING MACHINES.

Specification forming part of Letters Patent No. 53,080, dated March 6, 1866; antedated October 9, 1865; reissue No. 5,662, dated November 18, 1873; application filed April 25, 1873.

*To all whom it may concern:*

Be it known that I, WILLIAM R. LANDFEAR, of the city of Hartford, in the county of Hartford and State of Connecticut, have invented a new and Improved Mechanism for Making Metallic Eyelets, of which the following is a specification:

In the accompanying drawings, Figure 1 is a vertical and longitudinal section of an apparatus or mechanism, constructed in accordance with my invention; Fig. 2, a front elevation of the same; Fig. 3, a side elevation thereof, and Fig. 4 a vertical section in a plane at right angles to Fig. 1. Fig. 5 is a top view of the bed-die; and Fig. 6 a top view of the eyelet-elevator. Figs. 7, 8, 9, 10, and 11 are views of the blank and eyelet at different stages in the production of the latter. Fig. 12 is a longitudinal view, on a larger scale, of the male former with a center teat or spur on its end.

In such drawings, A denotes the bed-die, formed in a block of metal, F, and being circular in shape, and having a diameter sufficient to enable it to cut from a strip of metal a circular disk of the proper size for the manufacture of an eyelet. This die is placed at the upper part of the chamber G, made within the block F, and opening through it transversely. Within the said chamber, and standing vertically therein, is a male former, B, which is a round rod, formed frusto-conical at the top, and with a small teat or spur, *a*, extending upward from the center of its upper end, the object of the said spur being to enter the eyelet disk or blank and hold it from slipping out of place on the said former during descent of the female or fellow former and punch. Without this centering teat or spur *a* the blanks, of which the eyelets are made, are constantly liable to be drawn sidewise or out of line with the formers and punch, which is due sometimes to the punch getting worn on one side, so that it does not cut as well on that side as on the other; also, again, any imperfection in the metal of the blank tends to make the punch draw the latter to one side. The punch C is situated directly over the die A, and contains a conical chamber, C′, at the head of which is a circular die, *d*, from which a passage should lead upward and subsequently run laterally through the side of the punch. The purpose of the die *d* is to operate with the male former B, and cut the head or closed end of the bell-shaped cone formed from the die by the action of the conical chamber C′ and the former B, the part or disk so separated from the eyelet-blank being driven into the passage *f*, through and out of which it will eventually be forced by succeeding disks, which, like it, may be caused to enter the passage. There is applied to the shank of the male former B an eyelet-elevator, D, which encompasses the said former, and has a small annular groove, *b*, arranged in its top, in manner shown in Figs. 1 and 6, the latter figure being a top view of the said eyelet-elevator. Such eyelet-elevator is supported on an arm or carrier, H, which extends into the chamber G and serves to raise and depress the eyelet-elevator, as circumstances may require. The purpose of the said eyelet-elevator is to remove the eyelet-blank from the former B, and subsequently hold such blank and force it upward into the flanging-die *c*, constructed within a plate, E. The said flanging-die is bell-shaped, and is intended to form the eyelet with the usual flanch or flange. The die also contains a small plunger, *d′*, whose office is not only to expel the eyelet from the die, but to level down or even its upper edge for the purpose of preventing the eyelet from splitting at such edge when the latter is turned down or over by an eyeleting-machine. Each of the movable operative parts C, D, E, and *d′* should have suitable mechanism applied to it for moving it into the order and manner required for it to perform its proper function or functions.

In the operation of the mechanism hereinbefore described, the strip of metal from which the eyelets are to be made should be fed or moved forward over and on the die A, and between it and the plate E, with a suitable intermittent motion. During each interval of rest of the strip, the punch C should be caused to descend and pass into the die A far enough not only to cause the teat or spur *a* to enter the disk or blank severed from the strip by the conjoined action of the punch and the die, and upset the blank, or, in other words, to so crowd it down upon the former B as to reduce the blank to the form of a hollow conic frustum, but to separate from it the solid part of its head or upper end, the part so separated being a disk and being forced into the passage *f*. Next, the punch C should be raised wholly out of the die A, and far enough above the same to allow the plate E to be moved in a manner to carry the flanging-die *c* directly over the former B, which having taken place, the elevator D should be raised on the former B until it may not only have detached the eyelet-blank therefrom, but crowded such blank hard up into the flanging-die and caused the latter to impart to the blank a form necessary to make on it the usual flange at its lower base. After the accomplishment of all this, the parts D and E are to assume their original positions and the plunger *d'* is to be forced downward so as to expel the eyelet from the die *c*, the said eyelet dropping into and passing through a recess, *i*, made in the block F. Fig. 7 denotes a top view, and Fig. 8 a transverse section, of the disk or eyelet-blank, as it appears when first severed from the strip. Fig. 9 represents a vertical section of the eyelet-blank after its reduction to a cup shape by the action of the two formers. Fig. 10 exhibits a vertical section of the eyelet-blank in the form it has after the action of the former B and the die *d*. Fig. 11 is a vertical section of the blank as it appears after being acted upon by the elevator D and the spreading-die *c*.

What is here claimed, and desired to be secured by Letters Patent, is—

1. The combination and arrangement of the die A, the male former B, the punch C, the female former C', the elevator D, and the flanging-die *c*.

2. The combination of the die *d* and the expelling-passage *f* with the female former C', the punch C, the male former B, and the die A, all constructed and arranged substantially as described.

3. The combination of the die *d*, the expelling-passage *f*, the female former C', the punch C, the male-former B, the elevator D, and the die *c*.

4. The male former B, provided with a centering teat or spur, *a*, substantially as and for the purpose herein specified.

5. The combination and arrangement of the teat or spur *a* with the male former B, the die A, the punch C, and the female former C', all constructed and arranged as described.

6. The combination and arrangement of the annular groove *b* with the elevator D and the flanging-die *c*.

WILLIAM R. LANDFEAR.

Witnesses:

THOMAS G. WELLES,

CHAS. J. COLE.